Figure 3:
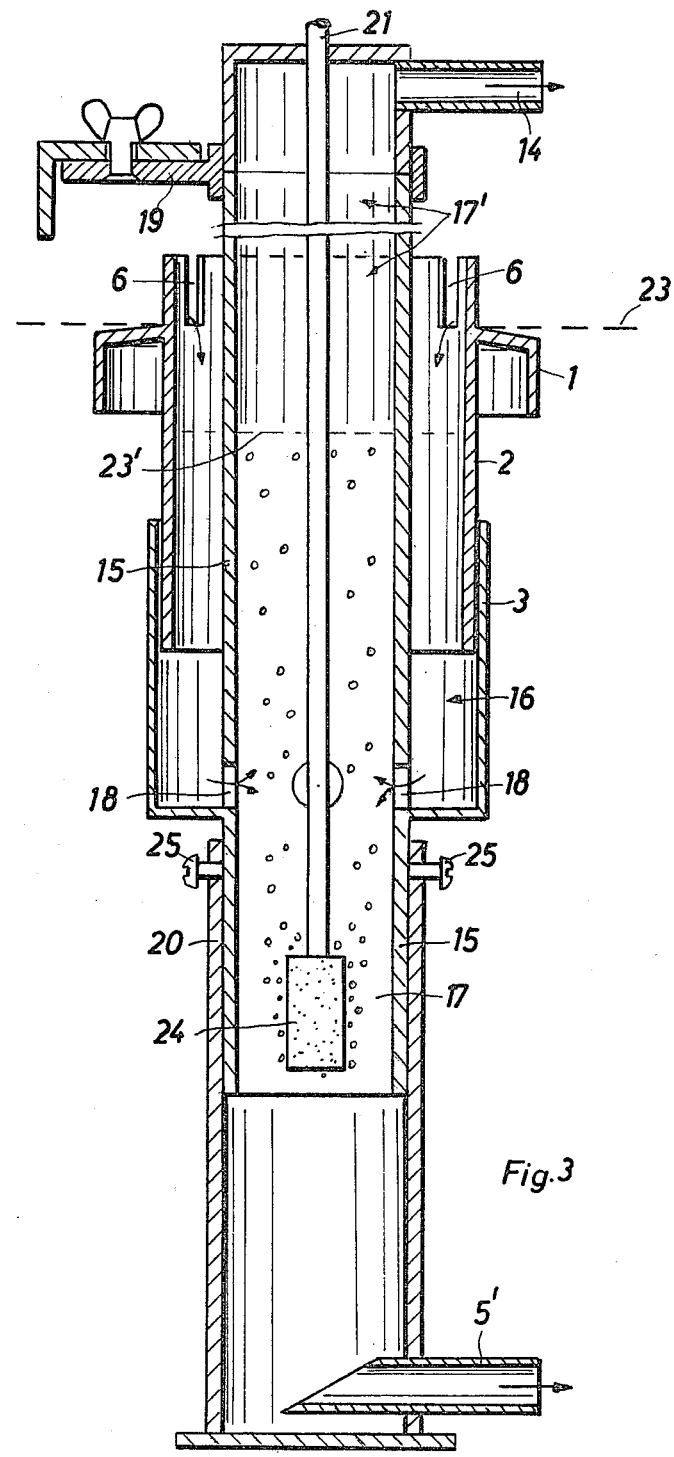

United States Patent [19]

Walther

[11] 4,333,829
[45] Jun. 8, 1982

[54] AQUARIA INLET MEANS

[76] Inventor: Gerhard Walther, Zeilsheimerstr. 27a, 6238 Hofheim, Taunus, Fed. Rep. of Germany

[21] Appl. No.: 166,992

[22] Filed: Jul. 9, 1980

[51] Int. Cl.³ .................................................. E04H 3/20
[52] U.S. Cl. .................................... 210/169; 210/242.1
[58] Field of Search ................... 210/169, 242.1, 242.3; 119/5; 15/1.7

[56] References Cited

U.S. PATENT DOCUMENTS

| 367,576 | 8/1887 | Allen | 210/242.1 |
| 1,107,391 | 8/1914 | Welch | 210/242.3 |
| 2,303,757 | 12/1942 | Pierson | 210/169 |
| 3,151,069 | 9/1964 | Halpert | 210/169 |
| 3,223,243 | 12/1965 | Muller | 210/242.3 |
| 3,303,932 | 2/1967 | Hirs et al. | 210/242.1 |
| 3,616,919 | 11/1971 | Leddem | 210/169 |
| 3,719,278 | 3/1973 | Kolfertz | 210/169 |
| 3,785,493 | 1/1974 | Harding | 210/169 |
| 4,033,719 | 7/1977 | Conn et al. | 210/169 |
| 4,216,090 | 8/1980 | Dockey | 210/169 |

FOREIGN PATENT DOCUMENTS

| 2304876 | 8/1974 | Fed. Rep. of Germany . |
| 7635528 | 11/1976 | Fed. Rep. of Germany . |
| 2828478 | 10/1979 | Fed. Rep. of Germany . |

Primary Examiner—Theodore A. Granger

[57] ABSTRACT

The present invention is concerned with an apparatus for removing foreign matter from the top surface of water, for use with aquaria, which comprises a discharge tube stationarily disposed in the aquarium and having its upper opening rim below the water surface, in which tube is disposed another tube open at the top and bottom and provided with a float in the upper end region.

7 Claims, 4 Drawing Figures

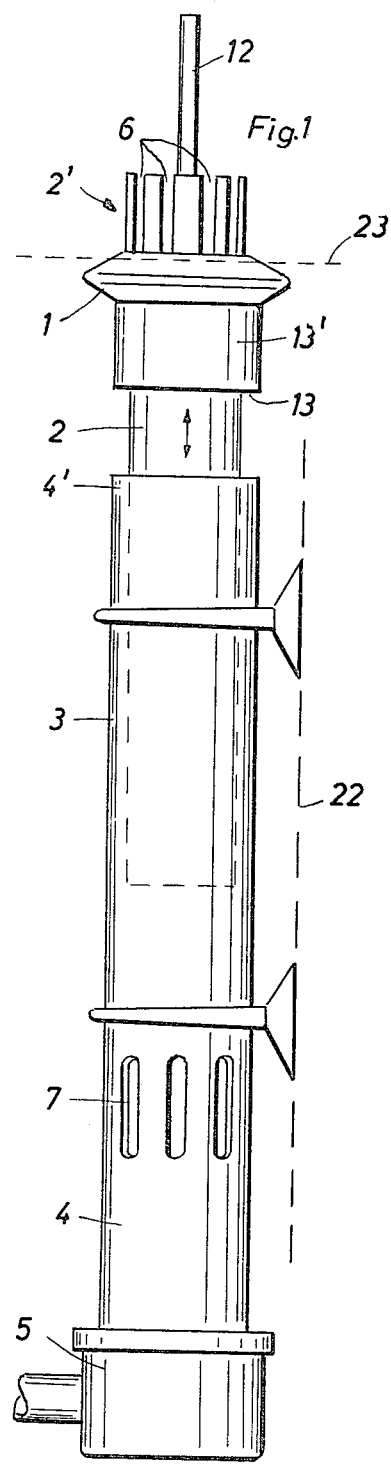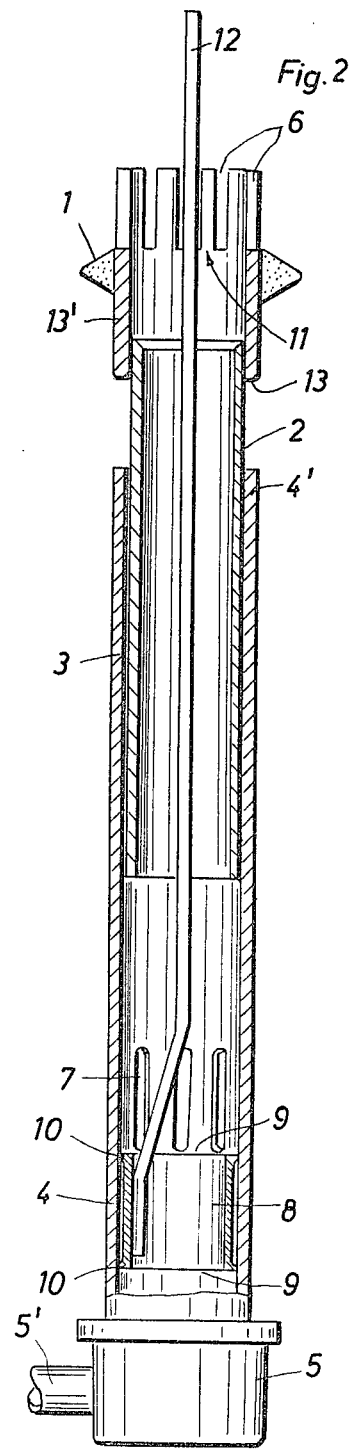

AQUARIA INLET MEANS

The present invention relates to an inlet means in an aquaria recirculatory system utilizing a pump for removing water and foreign matter from the aquaria, especially the top surface thereof, passing it through a filter and releasing the filtered water back to the aquaria.

When keeping aquaria it is unavoidable for undesired harmful substances to accumulate on the top of the surface of water. Moreover, it is unavoidable that an evaporation of the water standing in the aquarium take place. For this reason, devices have been suggested in the prior art that do not only simply take water randomly from the aquarium to supply the same to a suction filter but that are rather also especially intended to draw off the top surface water, and along therewith, the undesired substances accumulating there.

The apparatus of the aforementioned type according to DE-OS No. 28 28 478 is intended to serve the same purpose. However, that apparatus is formed as a filter system and, mechanically, is a relatively complex device taking a relatively large space within the aquarium since it is disposed in a casing of very large cross-section stationarily arranged in the aquarium and, open at the bottom relative to the aquarium volume, is a float housing movable up and down, above the upper end of which forming the overflow rim is seated an air enclosing hood forming the float.

The float housing is subdivided by a tubular filter insert into a crude water and a cleaned water space. Apart from the costly and voluminous structure, this device does not satisfactorily perform the feeding and filtering functions as the entire float housing relatively easily can oscillate up and down and, moreover, small fish can readily get into the float housing through the relatively large annular gap between the hood and outer wall of the float housing. The filter insert can contaminate and plug relatively quickly which will disturb the function of removal of foreign matter from the top surface. The pump provided at the outer housing which receives the float casing, will then no longer draw off the surface water but will rather draw the water through the bottom opening of the outer housing, i.e. neither a filtering nor a surface water extraction will take place.

Moreover, the float housing is guided only at the upper narrow opening rim under a gap formation, which can easily result in an interference with its free up and down movement.

Another prior art device (DE-GM No. 76 35 528) comprises a stationary tube having mounted thereon a hood slitted in the side walls thereof through which extends from the top a suction tube into the stationary tube downwardly connected to which is an additional tube including a strainer.

That device is not suitable to adequately fulfill the intended purpose since the surface extraction can be effected satisfactorily only if the surface has not been lowered too much under the slits of the hood by evaporation. Moreover, it is likely that the slits of the hood will plug. It has been attempted to take into account these adverse circumstances by the provision of the lower strainer, which in case of an inadequate supply from the top is intended to supply the amount of water set on the suction filter pump. This means that in case of a water surface excessively lowered by evaporation— which can occur relatively suddenly—a top surface water extraction is no longer effected.

Of similar construction is a device according to US PS No. 3 785 493 in which the bottom side is not provided with a strainer. However, for this reason, the supply slits are of a correspondingly long configuration extending far down under the water surface.

According to DE-OS No. 23 04 876 it is known in the art to close supply slits remote from the surface by an adjustable slide. That filter device operating by skimming, is not suitable to draw off top surface water.

Basic to the invention is the problem of improving an apparatus for removing foreign material from the top surface of water of the aforementioned type to the effect that while safeguarding a simple and room-saving structure, a satisfactory surface extraction and movability of the float casing is attained.

This problem is solved according to the invention by the provision of an inlet means for use in an aquaria recirculating system utilizing a pump for removing water from the aquaria, passing it through a filter, and returning the filtered water back to the aquaria, comprising a water discharge tube with means for connection to a pump at its lower end and an open upper end, a float tube with open lower and upper ends, the lower end of which is engaged within the open upper end of the water discharge tube whereby it may slide vertically with respect thereto, float means supporting the float tube at its open upper end, vertically-elongated slots formed in the lower region of the water discharge tube and vertically-adjustable closure means located behind the slots to permit manual adjustment of the inlet size in varying the fluid flow rate therethrough, whereby liquid may be simultaneously collected from both the upper surface and the lower regions of the body of water located in the aquaria, be filtered, and returned to the aquaria by the pump means. Preferably, a weir with vertically slotted openings is constructed and arranged to be supported by the float means at the open upper end of the float tube.

The structure of the invention provides an apparatus which, as to the space requirements thereof, is not substantially larger than a normal aquarium water heating, with the entire system substantially comprising only two telescopically arranged tubes.

The term "movable" shall mean that the float tube on the one hand can easily adjust itself under the action of the float, while on the other hand, the float tube is to seat as closely as possible in the stationary tube. On account of the fact that the upper rim of the float tube through the float consistently maintains the same adjustment relative to the water surface, an evaporation of water and thus a lowering of the water surface relative to the function of the apparatus cannot take place.

In the resting position, the entire apparatus is filled with water, and the same level as that of the ambient water is automatically adjusted.

As soon as the suction filter has been turned on, the water is drawn off the stationary tube; however, this will, to a minor degree, change the lift of the float tube (the water level in the stationary tube slightly lowers) and the float tube despite its float slightly sinks, with the overflow rim of the float tube getting slightly under the water surface of the aquarium so that the surface water can enter.

A special embodiment of the invention is also disclosed which, while having the same principle of construction, also protein skimming. In this embodiment, the inlet comprises a water discharge tube having an upper end with a froth outlet and a lower end, means for connection to a pump at its lower end, an annular L-shaped flange connected about and extending to the periphery of the water discharge tube between the upper and lower ends thereof which, in cooperation with said water discharge tube, defines an annular chamber therebetween, and fluid connection openings formed through the water discharge tube for establishing fluid communication between the annular chamber and the interior of the water discharge tube, a float tube with open lower and upper ends telescopically and slidably received within the annular chamber whereby it may slide vertically with respect thereto, float means supporting the float tube at its open upper end, and means for discharging air into the lower portion of the water discharge tube, whereby liquid may be collected from the upper surface of the body of water located in the aquaria and caused to flow over the open upper end of the float tube and out the lower end thereof, into the annular chamber and through the fluid communication openings into the lower portion of the water discharge tube to be thereafter filtered and returned to the aquaria by the pump means, while simultaneously, protein entering the interior of the water discharge tube is foamed by said means for discharging air causing it to accumulate as froth which rises above the water level in the interior of the water discharge tube and exists via said froth outlet at the upper end thereof.

Figure 4:
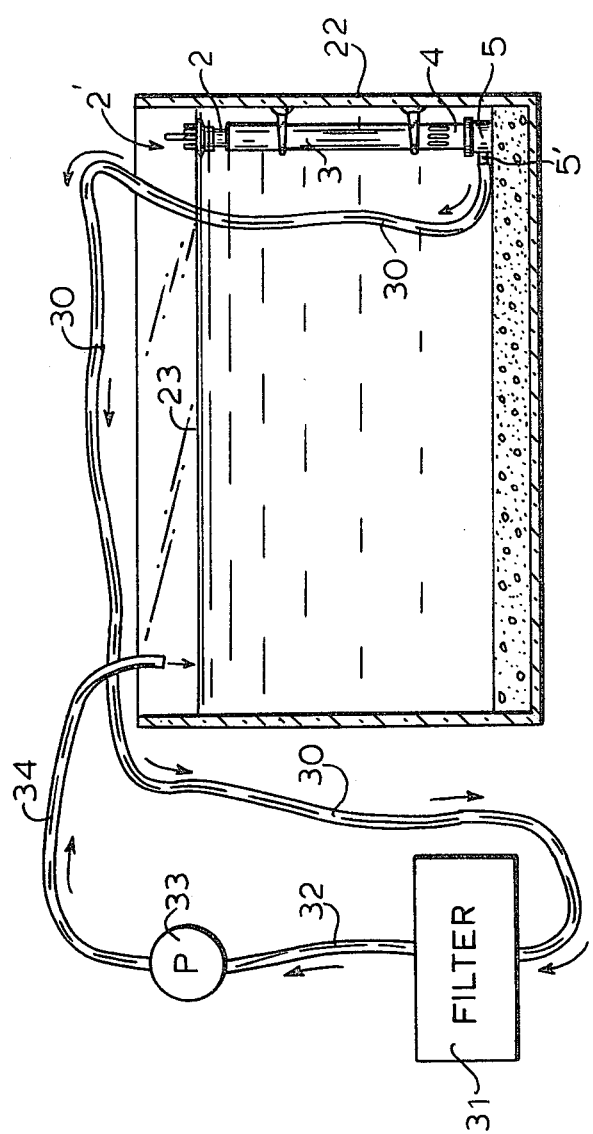

The apparatus of the invention and the advantageous embodiments thereof will now be described in further detail with reference to the drawing, wherein FIG. 1 is a side view of the apparatus, FIG. 2 is a sectional view of the apparatus according to FIG. 1, FIG. 3 is a sectional view of a special embodiment of the apparatus, and FIG. 4 is a partially schematic side view of the entire recirculating and filtering system.

With reference to the drawing the apparatus according to FIGS. 1,2 is essentially composed of three parts only, namely float 1, float tube 2 and stationary tube 3 which is secured to the inner wall 22 of the aquarium, for example, by way of suction holders. The upper end of float tube 2 (tube projection 2') including inlet slits 6 and inlet opening 11, need not necessarily be formed as a separate assembly 13' as shown, but the upper end can rather also be directly part of float tube 2 as such. The regulating distance of float tube 2 is limited toward the bottom by a mounting shoulder 13.

The stationary tube at the bottom end is closed by a connection 5 for a tube 30 which, preferably, is of a replaceable configuration in order to permit, if need be, another corresponding connection with a larger or smaller filter discharge conduit. Tube 30 leads to a filter 31 which is connected via tube 32 to a pump 33 which, in turn, leads back to the aquaria 35.

Preferably, slits 7 are provided underneath the regulating distance of float tube 2 in tube 3 which slits, by way of a cylindrical slit closure 8, steplessly can be more or less opened or closed. The adjustment is effected by means of a set rod 12 at the top extending out of float tube 2.

Float 1 need not necessarily be of the configuration as shown in FIGS. 1,2; it can rather also be open towards the bottom in bell-type manner as shown in a FIG. 3.

With a correspondingly adjusted water amount withdrawal, in addition to the surface water, an additional amount of water can be withdrawn through open slits 7 with no interference with the overflow function relative to the surface water, i.e., it is possible to withdraw through slits 7, for example 200 l/hr, with an approximately constant amount of only 50 l/hr being withdrawn irrespective thereof from the surface area 23 (demonstrated in FIG. 1 in broken lines). Slit closure 8, preferably, is provided with sealing lips 10 at the upper and lower rims thereof in order to ensure a reliable closure.

Although not shown, connector 5 could be eliminated, connecting piece 5' could be disposed directly above slits 7, the cylindrical slit closure 8 could be replaced by a piston and stationary tube 3 at the bottom could be closed in a different manner.

In another embodiment according to FIG. 3, the stationary tube 3 and the float tube 2 are expandedly formed and the stationary tube 3 at the top is provided with an extension 15 closed at the upper side and provided with a foam discharge connector 14, with the inner space 16 of the two tubes 2,3 and the inner space 17 of the extension 15 being connected by openings 18 and an air outlet element 24 being disposed in the inner space 17. As a result, the apparatus while maintaining the advantageous principle of surface extraction relative to the two tubes 2,3 also serves as a protein frother. The expanded float tube 2 depending on water surface 23 can adjust itself in the correspondingly expanded stationary tube 3; however, air is supplied to extension 15 through the air inlet element 24 which air flows upwardly thereby foaming the protein flown in through openings 18 along with the water, which protein accumulates as froth above water level 23' in the free inner space 17' of extension 15, rises on account of the constant foam supply and leaves extension 15 through the froth outlet 14.

The air is supplied from the top to the air outlet element 24 through a conduit 21. Moreover, extension 15 at the upper end is provided with a holder 19 by way of which the entire device can be secured, for example, at the upper aquarium edge.

As shown, extension 15 is telescopically seated in a telescopic tube 20 and can be fixed therein depending on the water level, for example, by clamping screws 25.

Connecting piece 5' for the water extraction extends through the wall of the telescopic tube 20 and, below the air outlet element 24, projects into inner space 17.

Telescopic tube 20 can comprise several telescopic tubes so that the device can substantially be used with all aquaria of different water depths.

What is claimed is:

1. For use as an inlet means in an aquaria recirculating system utilizing a pump for removing water from the aquaria, passing it through a filter, and returning the filtered water back to the aquaria, the inlet comprising a first water tube with means for connection to a pump at its lower end, an open upper end, a second tubular assembly with an open lower end located within said first water tube and arranged for slidable movement with respect to said first tube, the second tubular assembly further comprising float means supporting an open upper end whereby water from the surface of a body of water may be collected, vertically-shaped inlet slots located in the surface of said first water tube, vertically adjustable closure means for said slots located behind said slots constructed and arranged to permit manual adjustment of the inlet opening size of said slots in varying fluid flow rate therethrough, whereby liquid may be simultaneously collected from both the upper surface and the lower regions of the body of water located in the aquaria, be filtered, and returned to the aquaria by said pump means.

2. The inlet means of claim 1, wherein a weir with vertical slotted openings is constructed and arranged to be supported by said float mean at the open upper end of said tubular assembly.

3. The inlet means of claim 1, wherein said closure means has sealing lips for fluid-tightly engaging said water discharge tube.

4. For use as an inlet means in an aquaria recirculating system utilizing a pump for removing water from the aquaria, passing it through a filter, and returning the filtered water back to the aquaria, an inlet comprising a water discharge tube having a closed upper end with a froth outlet and a lower end, means for connection to a pump at its lower end, an annular L-shaped flange connected to and extending about the periphery of the water discharge tube between the upper and lower ends thereof which, in cooperation with said water discharge tube, defines an annular chamber therebetween, and fluid connection openings formed through the water discharge tube for establishing fluid communication between the annular chamber and the interior of the water discharge tube, a float tube with open lower and upper ends telescopically and slidably received within the annular chamber whereby it may slide vertically with respect thereto, float means supporting the float tube at its open upper end, and means for discharging air into the lower portion of the water discharge tube, whereby liquid may be collected from the upper surface of the body of water located in the aquaria and caused to flow over the open upper end of the float tube and out the lower end thereof, into the annular chamber and through the fluid communication openings into the lower portion of the water discharge tube to be thereafter filtered and returned to the aquaria by the pump means, while simultaneously, protein entering the interior of the water discharge tube is foamed by said means for discharging air causing it to accumulate as froth which rises above the water level in the interior of the water discharge tube and exists via said froth outlet at the upper end thereof.

5. The inlet of claim 4, further comprising a holder affixed to the closed upper end of said discharge tube for mounting the apparatus on the aquaria.

6. The inlet of claim 4, wherein said discharge tube has a tubular extension and the connector, and it further comprises a base tube telescopically receiving the tubular extension and means adjustably fixing the tubular extension in relation to the base tube.

7. The inlet of claim 4, wherein said means for discharging comprises an air delivery element having an air supply conduit leading from the element through and out of the closed upper end of the inner tube.

* * * * *